United States Patent [19]
Lin et al.

[11] Patent Number: 5,690,988
[45] Date of Patent: Nov. 25, 1997

[54] PET FOOD COMPOSITION OF IMPROVED PALATABILITY AND A METHOD OF ENHANCING THE PALATABILITY OF A FOOD COMPOSITION

[75] Inventors: Charles F. Lin; Jack K. Lin, both of Topeka; Dennis E. Jewell, Auburn; Philip W. Toll, Vally Falls; Neil P. Stout, Topeka; Larry R. Prewitt, Auburn, all of Kans.

[73] Assignee: Colgate Palmolive Company, New York, N.Y.

[21] Appl. No.: 594,607

[22] Filed: Feb. 2, 1996

[51] Int. Cl.⁶ .............................. A23K 1/18; A23K 1/16; A23L 1/29; A23L 1/302

[52] U.S. Cl. .............................. 426/635; 426/89; 426/97; 426/648; 426/650; 426/805; 426/102; 426/534; 426/72

[58] Field of Search .................. 426/89, 87, 648, 426/650, 805, 102, 534, 635, 72

[56] References Cited

U.S. PATENT DOCUMENTS

| | | | |
|---|---|---|---|
| 2,601,112 | 6/1952 | Freedman | 426/649 |
| 2,955,042 | 10/1960 | Firor et al. | 426/649 |
| 3,679,429 | 7/1972 | Mohrman et al. | |
| 4,191,783 | 3/1980 | Burkwall, Jr. et al. | 426/335 |

*Primary Examiner*—Donald E. Czaja
*Assistant Examiner*—Choon P. Koh
*Attorney, Agent, or Firm*—Paul Shapiro

[57] ABSTRACT

A food composition having improved palatability to cats comprising a nutritious food mass and an palatability enhancing amount of a choline compound. The choline compound is incorporated within, or applied to the surface of, the cat food composition.

20 Claims, No Drawings

PET FOOD COMPOSITION OF IMPROVED PALATABILITY AND A METHOD OF ENHANCING THE PALATABILITY OF A FOOD COMPOSITION

BACKGROUND OF THE INVENTION

1. Field of the Invention—Pet Animals

This invention generally relates to a pet food composition and particularly a pet food having increased palatability to cats.

2. Prior Art

Pet foods provide a convenient and popular means for assuring proper feeding. While the art is well aware of the nutritional requirements of pets and is experienced in making rations which are balanced to provide complete nutrition when eaten, the foods must be made sufficiently palatable for the pet to assure that the ration is readily consumed in the required amounts. This is especially important in disease management diets. The pet must eat the food to benefit from its nutritional value and the pet owner will not buy a second package if it is initially rejected by the pet. This is especially true if the pet is suffering from a loss of appetite as one symptom of a disease or disorder, the food will not be fully consumed and consequently less than the recommended ration will be eaten.

Pet animals, particularly cats, are notoriously fickle in their food preferences and require a high degree of palatability. Dry pet foods are widely marketed for cats. Generally, commercially sold dry cat food products have a relatively low moisture content of less than about 12% by weight and provide excellent nutrition. The lower moisture content permits a higher degree of nutritional balancing of ingredients. Typically, the dry pet food product is produced by extrusion techniques and is generally well accepted by the cat but has the drawback that the product is significantly lower in palatability than canned or high moisture products that contain meat and have a moisture content above 50% by weight. One solution to the problem of low palatability of dry cat foods is to add a palatability enhancer to the food so that the cat will more readily accept the dry food product. In the pet food industry, materials such as animal origin digests, organic acids and their salts, and different types of meat proteins are commonly used to enhance the palatability of pet foods for cats. In spite of the effectiveness of these materials, a need has continually existed for additives or ingredients that can be added to cat food products to further enhance the palatability of the product without reducing its nutritive properties.

SUMMARY OF THE INVENTION

The present invention provides a cat food composition of improved palatability wherein a palatability enhancing amount of a choline compound is incorporated within, or applied to the surface of, the cat food composition.

The use of choline compounds to enhance the palatability of cat food compositions has been found to be applicable to a wide range of commercial cat food products, and particularly dry cat foods.

Choline compounds have not been considered as palatability enhancers in the pet food industry although choline chloride has been included internally in pet foods at levels up to 0.24% by weight as a nutrition supplement. As will hereinafter be demonstrated, when included internally at such concentration levels, choline chloride has little or no effect on palatability enhancement in cat food.

Various methods of adding the choline compound to cat food compositions may be employed in accordance with the practice of the present invention including: applying the choline compound uniformly mixed with other ingredients of the cat food during manufacture so that the choline compound forms a part of the basal food or topically applying the choline compound as a coating to the surface of the food product after its manufacture. Regardless of the method of addition, the presence of the choline compound, at levels appropriate for the manner of addition, provides the maximum degree of taste sensor response from cats resulting in a statistically significant enhancement in palatability.

DESCRIPTION OF THE PREFERRED EMBODIMENTS

Choline is the trivial designation for the compound, 2-hydroxy-N,N,N-trimethylethanaminium. The term "choline compound" as used herein means choline containing compounds including choline or structural analogs of choline in combination with various anions. These anions may include among others, any of the halides (fluoride, iodide, chloride and bromide) bitartrate, dihydrogen citrate, bicarbonate, and salicylate and mixtures thereof. Specific examples include butyryl choline chloride, phosphoryl choline, calcium tetrahydrate acetyl choline chloride/bromide, iodide, cholic acid, cholic acid sodium dihydrate, choline bicarbonate, choline bisulfite, choline chloride phosphate, choline hydroxide, choline iodide and choline betartrate. In a preferred embodiment, the choline containing compound is choline chloride. Choline chloride at doses of 60 mg/day is recommended by small animal nutritionists as a structural component of fat and nervous tissue.

The term "palatability", as used herein, encompasses within its meaning all of the various properties of the food sensed by the cat such as taste and smell. The cat food compositions and methods of enhancing the palatability thereof to which the present invention is intended to apply generally relate to cat food compositions of any moisture content but preferably a cat food prepared from a nutritionally balanced mixture of proteinaceous and farinaceous ingredients having a moisture content of less than about 75% by weight. It is presently believed, however, that the palatability enhancer of the present invention is especially important for use with dry cat foods, that is, foods having a moisture content of less than about 12% because of their relative need for some palatability enhancement.

The term "cat food composition", as used herein, is generally intended to apply to commercially sold, nutritionally balanced cat food compositions. Cat food compositions meeting this definition are characterized by a minimum protein content since there is a certain minimum protein level required when the cat food composition provides the sole food intake for the cat. Commercially sold dry cat food compositions typically have a minimum protein content that is dependent upon the age of the animal to which it is to be fed, or if the animal is mature, whether or not it is involved in breeding. Thus, while females involved in breeding, or kittens would require a minimum protein content of at least about 28% by weight and preferably about 30–35% by weight on a 90% dry matter basis in the composition, cats not in either of the above two categories, e.g., mature cats not involved in reproduction, would require a minimum protein level of at least about 20% by weight based on a 90% dry matter basis in the composition. Preferably, the protein content will be at least 25% by weight and more typically at least about 30% by weight on a 90% dry matter basis in the cat food product.

The cat food compositions of the present invention to which the choline compound is added are not intended to be restricted by any specific listing of ingredients since these will be entirely dependent upon the nutritional balance of the ration desired as well as their availability to the pet food manufacturer. Generally, aside from the nutrition balancing additives such as vitamins and minerals, or other additives such as preservatives, emulsifiers, included in products of this type, commercial pet food compositions for the most part consist of ingredients that may either be termed substantially proteinaceous or ingredients that may be termed substantially farinaceous. Although the following description should not be considered limiting for the purposes of the present invention, the proteinaceous ingredient may be defined as any material having a protein content of at least about 15% by weight whereas the farinaceous material may be defined as having a protein content below about 15% by weight and a major fraction of starchy or carbohydrate containing materials.

Examples of proteinaceous materials typically used in commercial pet foods are: vegetable protein meals such as soybean, cottonseed, and peanut; animal proteins such as casein, albumen, and meat tissue including fresh meat; as well as rendered or dried animal "meals" such as fish meal, poultry meal, meat meal, bone meal, and the like. Other types of proteinaceous materials include microbial proteins such as yeast and other types of protein such as wheat gluten or corn gluten.

Examples of typical farinaceous materials are grains such as corn, rice and wheat and various other grains which are relatively low in protein.

The choline compound may be applied in accordance with the practice of the present invention, after manufacture of the cat food, in a palatability enhancing amount, to the surface of the cat food composition generally in an amount of about 0.06% by weight or more and preferably about 0.12 to about 0.60% by weight based on the weight of the food composition and most preferably about 0.24 to about 0.30% by weight. This level of choline compound provides a significant palatability improvement over cat food compositions of identical formulation to which the choline compound has not been topically applied to the food product surface.

When admixed with the other ingredients of the cat food during manufacture and present internally therein palatability enhancement, an amount of choline compound of at least about 0.25% by weight or within a preferred range of about 0.30 to about 0.60% by weight is included in the food composition. When so incorporated within the food composition, it is critical that at least about 0.25% of the choline compound is present for as will hereinafter be demonstrated, when the choline compound is present internally in the food product in lesser amounts, little or no palatability enhancement is observed.

Also in accordance with the practice of the present invention, the choline compound may be used in combination with other known palatability enhancers. For example, phosphoric acid, coated onto the surface of a dry cat food, has been shown to be a palatability enhancer. U.S. Pat. No. 3,679,429 discloses a method for improving the palatability of dry cat food by coating the food with fat and one of the following flavor enhancing acids: hexamic, tartaric, fumaric and lactic acids, phosphoric and citric acids. U.S. Pat. No. 3,930,031 discloses improving the palatability of semi-dry and dry cat food by coating the food with a mixture of phosphoric acid and citric acid wherein the coating provides at least 0.5% by weight phosphoric acid.

The added acid also provides a preservative or antimycotic action, inhibits spoilage due to contamination and acts as an alkaline buffer whereby the choline compound is stabilized to decomposition.

Insofar as the application of the palatability enhancing amount of the choline compound as a coating applied topically to the surface of the cat food, it is preferred to apply the choline compound as a dispersion with a fat material such as choice white grease in order to provide a uniform distribution of the choline compound on the food composition surfaces, thereby assuring maximum availability to the taste receptors of the cat.

In one means of effecting the application of the choline compound to the surface of a cat food composition, according to the present method of enhancing the palatability thereof, food particles such as those of the extruded type are transported while in a somewhat heated condition on a suitable conveyer to a spray chamber or mixing drum or vat. If a dry product is desired, the particles are first dried to a moisture level of below about 12% by forced air. A mixture of the choline compound and melted fat is separately formed in a mixing tank or metering pump by blending the requisite level of fat and choline compound which is then introduced to the spray chamber or mixing tank. The fat dispersion containing the choline compound is then sprayed on, or mixed with, the food particles to provide the desired level of fat and a palatability enhancing amount of the choline compound on the cat food particles. Following coating of the food particles, the coated particles are collected and then transported, if desired, to a tumbling drum or similar apparatus wherein the coated particles are tumbled repeatedly to improve the uniformity of the coating. The coated food particles can then be removed from the tumbling drum and cooled to ambient temperature.

If it is desired to incorporate the choline compound within the cat food product admixed with the other food product ingredients, the choline compound is merely admixed with the other ingredients of the food formulation preparatory to the manufacturing process as, for example, by extrusion, baking or canning processes.

Application of the choline compound to a food composition in a palatability enhancing amount either as a surface coating or intimately admixed with the other food ingredients results in significant palatability response from cats in comparison to the same cat food composition without the choline compound. A significant improvement in cat food formulation is, therefore, achieved by the application of the choline compound since the palatability of the composition to the cat is usually a controlling factor in the commercial success of such compositions.

Pursuant to a better understanding of the present invention, the following Examples describe illustrative but non-limiting embodiments thereof.

EXAMPLE I

Cat Food Composition Formulation Containing Choline Chloride Admixed With Other Food Ingredients An extruded cat food composition having a protein content of about 31% by weight on a 90% dry matter basis was prepared by mixing 0.30% by weight choline chloride and major amounts of animal by-product meal, fish meal, brewers rice and yellow corn and minor amounts of yeast, cellulose, fiber, salt (sodium chloride), vitamins and minerals.

The choline chloride was completely admixed with the other ingredients before being extruded. The choline chloride was a commercial feed grade of choline chloride (60% purity). The ingredient mixture was then transferred to a steam preconditioner and subjected to steam and moisture in order to adjust the moisture content to between about 20 and 40% by weight. The conditioned mixture was then extruded under conditions of elevated temperature and pressure to form a continuous strand of product that was segmented into pieces or kibbles by a rotating cutting knife upon exit of the strand from the extruder. The particles were then conveyed to a forced air drying system and the moisture level reduced to below about 10% by weight. The dried, extruded kibbles were placed in a small cement mixer for mixing with choice white grease which was heated to about 122° F. This mixture was stirred for about 5 minutes to achieve a uniform coating. The so coated cat food was then placed in polyethylene-lined bags and stored at room temperature for about two days before being tested for palatability.

For purposes of comparison, the procedure of Example I was repeated with the exception that 0.24% by weight choline chloride was admixed with the other ingredients used to prepare the extruded cat food product.

The palatability of the two cat food products containing respectively 0.24 and 0.30% by weight choline chloride was measured using a palatability test which determined the extent to which cats may prefer one pet food diet over another pet food diet. In this palatability test two pan comparisons with a panel of 30 cats were used. Each cat was presented with two pans of food, each containing a measured amount of the test rations which were more food than the animal was expected to consume. The test was run for two days. The amount of food consumed was measured. A direct comparison of consumption of the two rations gives a reliable indication of relative palatability. The direct comparison or mean intake ratio, for all animals was made based on the intake ratio for each animal as follows: A/(A+B) where A is the sum of the weight consumed from Pan A containing pet food to which choline chloride had been added and B is the sum of the weight consumed from pan B containing a commercially available dry cat food sold for mature cats containing about 0.24% by weight choline chloride as a nutritional supplement, which served as a control.

The results of the palatability tests are recorded in Table I below. The higher the food intake ratio the greater the palatability of the food to the cats which participated in the test.

TABLE I

| Wt. % Choline Chloride Added to Food Composition | Preferring %* | Food Intake Ratio |
| --- | --- | --- |
| 0.24 | 23 | 0.35 |
| 0.30 | 68 | 0.63** |

*% of cats preferring the food containing choline chloride over the commercial cat food product which served as a control.
**p < 0.01 (Data is statistically significant to a confidence level of 99%).

The results recorded in Table I indicate that the palatability of dry cat food is significantly increased as compared to a commercially available cat food when the concentration of choline chloride is raised from 0.24% to 0.30% by weight levels.

EXAMPLE II

Cat Food Composition Containing Choline Chloride Incorporated in White Grease Surface Coating The procedure of Example I was repeated, except varying amounts of choline chloride were added to the choice white grease coating applied to the surface of the food particles.

A commercially available dry cat food containing 0.24% by weight choline chloride as a nutrition supplement, served as the control. The results are recorded in Table II below.

TABLE II

| Wt. % Choline Chloride Added to Food Composition in Coating | Wt. % Choline Chloride in Food Composition | Preferring %* | Food Intake Ratio |
| --- | --- | --- | --- |
| 0.06 | 0.30 | 67 | 0.56 |
| 0.12 | 0.36 | 57 | 0.50 |
| 0.18 | 0.42 | 60 | 0.58 |
| 0.24 | 0.48 | 80 | 0.74** |
| 0.30 | 0.54 | 75 | 0.66** |
| 0.54 | 0.78 | 73 | 0.68** |

*% of cats preferring food coated with choline chloride over the control food.
**p < 0.01

The results recorded in Table II show that when choline chloride is applied to the surface of cat food at concentration levels of 0.06% by weight or more, a substantial enhancement in the palatability of the food to cats is observed.

For purposes of contrast, the procedure of Example II was repeated except the commercial cat food, which contained 0.2% sodium chloride, was coated with choice white grease containing varying amounts of sodium chloride salt.

The commercial cat food without salt addition to the white grease coating was used as a control. The results are recorded in Table III below.

TABLE III

| Wt. % NaCl Added to Food Composition in Coating | Wt. % NaCl in Food Composition | Preferring %* | Food Intake Ratio |
| --- | --- | --- | --- |
| 0.10 | 0.30 | 40 | 0.47 |
| 0.40 | 0.60 | 25 | 0.42 |
| 0.70 | 0.90 | 18 | 0.25** |
| 1.00 | 1.20 | 29 | 0.34** |
| 1.30 | 1.50 | 8 | 0.19** |

*% of cats preferring food coated with sodium chloride containing choice white grease over the control food.
**p < 0.01

The results recorded in Table III indicate that saltiness induced by sodium chloride salt significantly decreased the palatability of the cat food. Thus, the palatability enhancement obtained from the use of choline chloride is not attributed to any saltiness of the compound.

EXAMPLE III

The procedure of Example II was repeated except inorganic acid such as phosphoric acid (75.0% solution) and organic acids such as malic acid powder (99.9% purity), fumaric acid powder (99.9% purity), and ascorbic acid powder (99.9% purity) were included in the choice white grease coating. A commercial cat food containing 0.24% by weight choline chloride as a nutrition supplement served as the control. The results are recorded in Table IV below.

TABLE IV

| Choline Chloride in Coating (Wt. %) | Wt. % Choline Chloride in Food Composition | Organic Acids in Coating (Wt. %) | % Preferring* | Food Intake Ratio |
|---|---|---|---|---|
| 0.06 | 0.30 | 0.00 | 67 | 0.56 |
| 0.06 | 0.30 | 0.40 phosphoric acid | 100 | 0.96** |
| 0.18 | 0.42 | 0.00 | 60 | 0.58 |
| 0.18 | 0.42 | 0.10 malic acid | 65 | 0.67** |
| 0.18 | 0.42 | 0.10 fumaric acid | 67 | 0.61** |
| 0.18 | 0.42 | 0.10 ascorbic acid | 75 | 0.67** |

*% of cats preferring grease coated food product containing palatability enhancing agent in the coating over the control food.
**p < 0.01

The palatability data recorded in Table IV indicates that the food composition surface with a combination of choline chloride and organic acids or inorganic acid were preferred to a greater degree by cats than the food in which organic acids were absent from the coating.

What is claimed is:

1. A food composition having an enhanced palatability to pet animals comprising a nutritious food mass and a palatability enhancing amount of a choline compound of at least about 0.25% by weight.

2. The food composition of claim 1 wherein the composition is surface coated with a coating containing the choline compound.

3. The food composition of claim 2, wherein the choline chloride is added to the food composition during manufacture.

4. The food composition of claim 1 wherein the choline compound is choline chloride.

5. The food composition of claim 1, wherein the composition also contains an inorganic or organic acid in addition to the choline compound.

6. The food composition of claim 5 wherein the acid is phosphoric acid.

7. The food composition of claim 5 wherein the acid is malic acid.

8. The food composition of claim 5 wherein the acid is fumaric acid.

9. The food composition of claim 5 wherein the acid is ascorbic acid.

10. A method of enhancing the palatability of a food composition having greater acceptance to pet animals comprising adding a palatability enhancing amount of at least 0.25% by weight of a choline compound to the food composition and feeding the food to pet animals.

11. The method of claim 10 wherein the choline compound is added to the food composition by topical application to the surface of the composition.

12. The method of claim 10 wherein the choline compound is added to the food composition during manufacture.

13. The method of claim 10 wherein the choline compound is choline chloride.

14. The method of claim 10 wherein an inorganic or organic acid is added in combination with the choline compound.

15. The method of claim 14 wherein the acid is phosphoric acid.

16. The method of claim 14 wherein the acid is malic acid.

17. The method of claim 14 wherein the acid is fumaric acid.

18. The method of claim 14 wherein the acid is ascorbic acid.

19. The food composition of claim 1 having enhanced palatability to cats.

20. The method of claim 10 wherein the pet animal is a cat.

* * * * *